United States Patent [19]

Hautier

[11] Patent Number: 4,845,191

[45] Date of Patent: Jul. 4, 1989

[54] PROCESS FOR GRINDING IN AQUEOUS SUSPENSION OF COARSE MINERAL INTENDED FOR PIGMENT APPLICATIONS

[75] Inventor: Gabriel Hautier, Champagne au Mt.d'OR, France

[73] Assignee: Coatex, Caluire, France

[21] Appl. No.: 28,070

[22] Filed: Mar. 19, 1987

Related U.S. Application Data

[63] Continuation of Ser. No. 893,533, Aug. 5, 1986, abandoned, which is a continuation of Ser. No. 773,509, Sep. 5, 1985, abandoned, which is a continuation of Ser. No. 541,694, Oct. 13, 1983, abandoned, which is a continuation of Ser. No. 285,945, Jul. 23, 1981, abandoned.

[30] Foreign Application Priority Data

Aug. 21, 1980 [FR] France ................................ 80 18474

[51] Int. Cl.$^4$ .............................................. C08F 6/00
[52] U.S. Cl. ..................... 528/489; 528/493; 528/494; 528/495; 528/496
[58] Field of Search ............... 528/493, 494, 495, 496, 528/489; 526/317.1

[56] References Cited

U.S. PATENT DOCUMENTS

| | | | |
|---|---|---|---|
| 2,265,937 | 6/1938 | Dittmar | 528/494 |
| 2,552,775 | 5/1951 | Fischer | 526/317 |
| 3,531,431 | 9/1966 | Nissan | 528/489 |
| 3,604,634 | 9/1971 | Windle | 241/16 |
| 3,657,378 | 4/1972 | Volk | 526/240 |
| 3,945,843 | 3/1976 | Holty | 106/308 M |
| 4,166,582 | 9/1979 | Steward | 241/16 |
| 4,166,811 | 9/1970 | Marr | 106/308 M |
| 4,167,485 | 9/1979 | Schenk | 526/240 |
| 4,186,027 | 1/1980 | Bell | 241/16 |
| 4,230,610 | 10/1980 | Falcione | 524/433 |
| 4,243,430 | 1/1981 | Sperry | 106/308 M |
| 4,301,266 | 11/1981 | Muenster et al. | 526/317.1 |
| 4,325,514 | 4/1982 | Hemingsley | 241/16 |
| 4,361,687 | 11/1982 | Arnot et al. | 526/317.1 |

FOREIGN PATENT DOCUMENTS 475370 9/1975 U.S.S.R. ..................... 526/317.1

*Primary Examiner*—Paul R. Michl
*Assistant Examiner*—Patrick A. Doody
*Attorney, Agent, or Firm*—Oblon, Spivak, McClelland, Maier & Neustadt

[57] ABSTRACT

Grinding agent for aqueous suspension of coarse mineral materials intended for pigment applications, composed of an alkaline acrylic polymer and/or copolymer, with an average specific viscosity of less than 0.8, formed of a fraction of this polymer and/or copolymer isolated by means of a polar solvent, the specific viscosity of said fraction comprised between 0.3 and 0.8.

7 Claims, No Drawings

PROCESS FOR GRINDING IN AQUEOUS SUSPENSION OF COARSE MINERAL INTENDED FOR PIGMENT APPLICATIONS

This application is a continuation of application Ser. No. 893,533, filed 8/5/86, now abandoned, which is a continuation of application Ser. No. 773,509, filed 9/5/85, abandoned, which is a continuation of application Ser. No. 541,694, filed 10/13/83, now abandoned, which is a continuation of application Ser. No. 285,945, filed 7/23/81, abandoned.

This invention relates to an improved grinding agent in aqueous suspension for grinding coarse mineral materials with which it is possible to obtain an aqueous suspension of refined mineral particles intended for pigment applications, less than two microns in size, at least 75% of which are less than one micron in size.

The invention also relates to an improved process for preparing, by means of grinding, an aqueous suspension of mineral materials, the viscosity of which remains virtually stable in time, thereby ensuring ease in handling and application said process is particularly applicable for grinding an aqueous suspension of calcium carbonate with a dry material content of at least 70% by weight, at least 95% of the constituent particles after grinding being less than two microns in size, 75% of which are less than one micron in size.

It is a well known fact that for a long time, mineral substances such as Calcium Carbonate, Calcium Silicate and Calcium Sulfate as well as Titanium Dioxide have been used to prepare industrial products in such fields as paint, paper coating, fillers for rubbers and synthetic resins, etc . . .

However, since the natural structure of these mineral substances is not laminated or lamellar which would facilitate their crumbling, as is the case for certain substances such as Aluminum Silicates usually known as Kaolins, the technician, in order to use these mineral substances in pigment applications, must transform them, as by means of grinding, into a very fine aqueous suspension, their constituent grains being as small as possible, i.e., less than a few microns.

By the very number of publications in this field, the specialized literature reveals the importance and complexity of grinding mineral substances in an aqueous medium in order to obtain a particularly refined quantity for pigment applications.

Where paper coating is concerned, it is well known that the coating mass formed of mineral pigments such as Kaolins, Carbonates, Calcium Sulfate and Titanium Dioxide, in suspension in water, also contains binders, dispersants and other additives such as thickeners and coloring agents. It is desirable that the viscosity of such a coating mass be low and stable during coating so as to facilitate its handling and application. It is also desirable that this coating mass have the highest possible mineral material content in order to reduce the quantity of heat energy needed to eliminate by drying the aqueous fraction of the coating mass. The technician would find that such an ideal suspension, combining all of these fundamental qualities, would resolve the well known problems related to grinding, storing, transporting the product from manufacturer to user and its transfer by pump during utilization.

It was noted that the techniques of grinding mineral substances in aqueous medium resulted in suspensions unstable in time, because of sedimentation of the mineral substances and an increase in viscosity. This is why the technician, using the oldest technical processes to obtain pigmentary substances by means of grinding, resigned himself to grinding mineral substances in aqueous suspension according to one or more successive operations, during and sorting out this ground substance by eliminating the particles which were not sufficiently fine, and separating the mineral particles displaying the desired pigment size in order to obtain a fine mineral powder low in water content. This find powder can then be easily transported from manufacturer to user where it will again be placed in suspension in water to be used as a pigment product.

The fact that the pigment mineral substance could not be maintained as an aqueous suspension from grinding to application urged the technician to conduct research in this field; this research consisted in grinding mineral substances in aqueous suspension which, after grinding, would give a pigment suspension the viscosity of which would remain low and stable in time. For example, French Pat. Nos. 1 506 724 proposes a process for preparing, by means of grinding, an aqueous suspension of Calcium Carbonate which remains stable in time; this process consists of using agitation to form an aqueous suspension containing 25 to 50% by weight of Calcium Carbonate and grinding this aqueous material with an appropriate grinding body in the presence of a dispersant. This dispersant is a water soluble acrylic polymer added to the grinding medium at a rate of 0.2 to 0.4% by weight of Calcium Carbonate present. However, although the pigment mineral suspension has the undeniable advantage of good stability in time, it still has major disadvantages that the technician could consider major. This is, for example, the case of the dry material content of such a suspension intended for grinding because it absolutely must be 25 to 50% by weight and preferably approximately 40% by weight. When this concentration drops below 25%, the process described is no longer economically interesting because of its low productivity, and when the initial concentration in dry material is above 50%, the efficiency of the grinding process is reduced because the viscosity of the medium increases significantly, preventing the grinding itself and yielding, because of this fact, a coarse granulometric suspension. Therefore, when the dry material concentration of a suspension for grinding is chosen in the 25 to 50% by weight range, the granulometry of the Calcium Carbonate obtained after a very long grinding period in the presence of a dispersant may be considered as favorable for pigment applications because the largest size of 95% of these particles is less than two microns.

The technician decided to find a new way since the sudden increase in viscosity prevented him from grinding an aqueous suspension of mineral substances with a more than 50% concentration. Processes for placing into suspension high dry material content mineral substances without grinding were then proposed. For example, French Pat. No. 1 562 326 relates to a process for preparing an aqueous suspension of mineral substances. The aim of this process is to obtain an aqueous suspension highly concentrated in dry material and sufficiently stable so as to be able to be transported as such from manufacturer to user. The process proposed consists in making an aqueous suspension of mineral materials containing 70 to 85% by weight of dry material, at least 99% by weight of the initial particles being less than or equal to 50 microns in size, then in agitating said suspension in the presence of a dispersant which can be Sodium or Potassium Salt of a polyphosphoric acid, polyacrylic acid, polysilicic acid, etc . . . introduced at a rate of 0.05 to 0.5% by weight with respect to the dry material weight of said suspension. The author notes that the dry material content of the suspension should not be more than 85% by weight because of the high increase in viscosity and wasn't able to be less than 70% by weight without causing detrimental sedimentation.

Therefore, prior art proposes solutions that the technician does not find completely satisfactory.

One of these solutions pertains to the grinding, in the presence of a dispersant, of an aqueous suspension of Calicum Carbonate; it is not sufficiently concentrated in dry material to be considered advantageous although it had the advantage of producing a very refined, low viscosity pigment suspension, yielding up to 95% particles less than two microns in size.

The other solution consists in preparing a high dry material content aqueous suspension, containing 70 to 85% be weight of mineral materials, 99% of the initial particles being less than or equal to 50 microns in size, by introducing a dispersant into the medium to stabilize these particles. But this process, although providing a low viscosity suspension, cannot be retained because the constituent mineral particles are too coarse and irregular in size for pigment applications.

The recommended processes did not satisfy the users' requirements, i.e., a pigment aqueous suspension concentrated in dry material and displaying all the qualities of great refinement, low viscosity and stability in time. Consequently, the Applicant, in his research, found and developed an agent for grinding mineral substances in aqueous medium making it possible to obtain a pigment suspension with all the desired qualities while eliminating the above-indicated disadvantages.

In our invention, the agent for grinding coarse mineral materials in aqueous suspension, intended for pigment applications, composed of alkaline acrylic polymers and/or copolymers, obtained by the known polymerization processes, is characterized by the fact that it is a fraction of an alkaline acrylic polymer and/or copolymer with a specific viscosity comprised between 0.3 and 0.8.

The process for grinding mineral materials in aqueous suspension using the grinding agent in our invention involves the preparation of an aqueous suspension of at least 70% by weight of these materials, the initial size of these materials being at the most 50 microns, and the introduction of the grinding agent into this suspension which is ground according to a known method.

As stated above, the use of alkaline acrylic polymers and/or copolymers as dispersants for mineral substances in aqueous suspension is well known. The alkaline acrylic polymers and/or copolymers are prepared according to known processes, by the radical polymerization of acrylic acid in the presence of polymerization regulators such as, for example, Hydroxylamine base ogranic compounds, and in the presence of polymerization initiators such as Peroxides and Peroxy salts, for example, Hydrogen Peroxide, Persulfate, etc . . . , and then by neutralizing the polymerizate. A sufficient quantity of this polymerizate is then introduced into the aqueous suspension of mineral materials undergoing agitation which causes the mineral load to be dispersed.

The Applicant, in his research, wanting to improve the grinding of mineral materials in aqueous suspension, tried to use such a polymerizate as a "grinding agent", by introducing it into the suspension of mineral substances containing at least 50% by weight of dry materials, percentage which was specified in prior art as the limit load not to be exceeded. The Applicant then noted that if the suspension was prepared in this way and ground, it became extremely viscous, so much so that under these conditions, it was ineffectual in grinding or dispersing the mineral materials satisfactorily.

Having made this observation, the Applicant sought to find out why the viscosity of the aqueous suspension of mineral materials, highly concentrated in dry material, increased during grinding and he observed, surprisingly enough, that the increased viscosity of the suspension was conditioned by the specific average viscosity of the alkaline acrylic polymers and/or copolymers used as grinding agents, the specific average viscosity being less than 0.8. So, by grinding several aqueous suspensions highly loaded in mineral materials, the Applicant was able to establish that the only fraction of the alkaline arylic polymer and/or copolymer possessing the basic qualities of a grinding agent is that having a specific viscosity of 0.3 to 0.8.

The alkaline acrylic polymer and/or copolymer fraction with a 0.3 to 0.8 specific viscosity intended for use as a grinding agent, is generally isolated and extracted from the solution resulting from the polymerization of Acrylic and/or Methacrylic, Itaconic, Maleic, Fumaric Acid, carried out according to known processes. After polymerization in the presence of well known initiators and regulators, the aqueous solution of polymerizate obtained is neutralized by an appropriate agent such as Sodium, Potassium, Ammonium, Zinc or Calcium Hydroxide, or by a primary, secondary or tertiary amine, aliphatic and/or ring, such as, for example, the Ethanolamines (mono, di, tri ethanolamine), monodiethylamine, Cyclohexylamine, Methylcyclohexylamine, etc . . .

The aqueous solution of polymerizate neutralized in this manner is then treated according to processes known to the technician, by a polar solvent from the group made up of Methanol, Ethanol, Propanol, Isopropanol, Acetone, Tetrahydrofuran. It then separates into two phases. The least dense phase, containing the major fraction of polar solvent and the undesirable acrylic polymer and/or copolymer fractions, is eliminated while the densest aqueous phase is collected and constitutes the akaline acrylic polymer and/or copolymer fraction with a 0.3 to 0.8 specific viscosity.

It is also possible and desirable in certain cases to refine once more the selection of the alkaline acrylic polymer and/or copolymer fraction by treating the previously collected densest phases again with a new quantity of polar solvent which can be different from the one initially used or a mixture of polar solvents. Two phases appear once more; the densest one, the aqueous phase, is collected and constitutes an alkaline acrylic polymer and/or copolymer fraction the specific viscosity of which lies within a narrower range. In practice, it was preferable to choose the alkaline acrylic polymer and/or copolymer fraction with a specific viscosity of 0.35 to 0.60.

The aqueous phase containing the alkaline acrylic polymer and/or copolymer fraction with a 0.3 to 0.8 specific viscosity can be used in this form as a grinding agent for mineral substances to be triturated; but it can also be treated by any known means to eliminate its aqueous phase and isolate the alkaline acrylic polymer and/or copolymer in the form of a fine powder which can be used in this other form as a grinding agent.

The temperature at which the process for selecting the alkaline acrylic polymer and/or copolymer fraction is carried out is not critical in itself because it only influences the coefficient of partition. In practice, this selection process is carried out at ambient temperatures, but this process at higher temperatures is not excluded.

The specific viscosity of the acrylic polymers and/or copolymers, symbolized by the letter "$\eta$", is determined as follows:

An alkaline acrylic polymer and/or copolymer solution is prepared by dissolving 50 dry g of polymer and/or copolymer in a liter of a distilled water solution containing 60 g of NaCl. Then, a capillary viscosimeter with Baum constant equal to 0.000105 placed in a bath thermostatically regulated at 25° C. is used to measure the flow time of a given volume of the above-indicated solution containing the alkaline acrylic polymer and/or copolymer and the flow time of the same volume of the Sodium Chloride aqueous solution without said polymer and/or copolymer. Viscosity, "$\eta$", may then be defined with the following formula:

$$\eta = \frac{\text{(flow time of polymer solution)} - \text{(flow time of NaCl solution)}}{\text{flow time of NaCl solution}}$$

The capillary tube is generally chosen so that the flow time of the NaCl solution without the polymer and/or copolymer is approximately 90 to 100 seconds; it thus gives very precise specific viscosity measurements.

After the fraction of alkaline acrylic polymer and/or copolymers with a 0.3 to 0.8 specific viscosity is isolated, grinding the material substance to be refined consists of grinding the mineral substances with a grinding body into very fine particles in an aqueous medium containing the grinding agent.

In practice, an aqueous suspension of the mineral substance to be ground, with an initial grain size at most equal to 50 microns, is made in a quantity such that the dry material concentration of said suspension is at least 70% by weight.

The grinding body with a granulometry preferably comprised between 0.20 millimeters and 4 millimeters, is added to the suspension of the mineral substance to be ground. The grinding body is generally composed of material particles as varied as Silicon Oxide, Aluminum Oxide, Zirconium Oxide or their mixtures, synthetic resins displaying a high degree of hardness, steels, etc... . In French Pat. No. 2 203 681, there is an example of the composition of such a grinding body. It describes grinding substances composed of 30 to 70% by weight of Zirconium Oxide, 0.1 to 5% by Aluminum Oxide and 5 to 20% of Silicon Oxide. Preferably, the quantity of grinding body added to the suspension is such that the weight ratio between the grinding material and the mineral substance to be ground is at least 2:1 and preferably between the limits 3:1 and 5:1.

The suspension-grinding body mixture then undergoes mechanical stirring, such as occurs in a classical microelement grinder.

The grinding agent composed of the alkaline acrylic polymer and/or copolymer fraction with a 0.3 to 0.8 specific viscosity is also introduced into the mixture formed by the aqueous suspension of mineral substances and the grinding body at the rate of 0.2 to 2% by weight of the dried fraction of said polymers with respect to the mass of the mineral substance to be refined.

The time required to obtain a perfectly fine mineral substance after grinding depends on the nature, and quantity of the mineral substance to be triturated, on the agitation mode used and the temperature of the medium during grinding.

The process in our invention can be used to refine very diverse mineral substances such as Calcium Carbonate, Dolomites, Calcium Sulfate, Kaolins, Titanium Dioxide, i.e., all mineral substances which must be ground to be usable in applications as varied as paper coating, pigmentation of paint and coatings, rubber or synthetic resin fillers, the dulling of synthetic textiles, etc . . .

Therefore, the grinding agent in our invention is applied to transforming, by means of grinding in aqueous suspension of highly concentrated dry material, coarse mineral substances into very fine particles, 95% of them always less than two microns in size and 75% of these less than one micron in size; it also makes it possible to obtain a suspension of very fine material substances, the viscosity of which is low and stable in time.

The following example will better demonstrate the scope and advantages of our invention:

EXAMPLE 1

This example, illustrating prior art, concerns the grinding of Calcium Carbonate in the presence of a grinding agent which is a Sodium Polyacrylate obtained by polymerization of Acrylic Acid in the presence of initiators and regulators that are obtained by two processes well known to the technician.

Test 1 consists of grinding Calcium Carbonate in the presence of Sodium Polyacrylate obtained by the radical polymerization of Acrylic Acid in water and then neutralizing with Sodium Hydroxide.

Test 2 consists of grinding Calcium Carbonate in the presence of Sodium Polyacrylate obtained by the radical polymerization of Acrylic Acid in aqueous medium, in the presence of Isopropanol, and is followed by distilling the alcohol and neutralizing the polymerizate with Sodium Hydroxide.

Both of these tests were carried out with the same experimental criteria; grinding is done in the same apparatus so that results can be compared.

For each test, an aqueous suspension of Calcium Carbonate from the Orgon lode (France), with granulometry less than 43 microns, was prepared.

The dry material concentration of the aqueous suspension was 76% by weight with respect to the total mass.

The grinding agent was introduced into this suspension in the quantities indicated in the table below, expressed in percent by weight with respect to the mass of calcium carbonate to be ground.

The suspension was placed in a fixed roll rotating impeller Dyno-Mill type grinder, its grinding body made up of corundum balls, 0.5 millimeters to 2.0 millimeters in diameter.

The grinding body occupied a total volume of 500 cubic centimeters while its mass was 1230 g.

The volume of the grinding chamber was 2500 cubic centimeters.

The peripheral velocity of the grinder was 10 meters per second.

The Calcium Carbonate suspension was recycled at a rate of 15 liters per hour.

The Dyno-Mill grinder outlet was equipped with a 300 micron mesh separator to separate the suspension resulting from grinding and the grinding body.

The temperature during each grinding test was maintained at 65° C.

The grinding time under the above-indicated experimentation conditions was 90 to 104 minutes and represented the time required to obtain a ground mineral substance with 75% of the particles less than one micron in size.

After grinding, the viscosity of the pigment suspension was measured with a Brookfield viscosimeter, at a temperature of 20° C. and a rotating speed of 100 rpm with moving body no. 3

After remaining idle for 24 hours and 8 days, the viscosity of the suspension was again measured after brief agitation.

All the results of the experiments are given in Table 1.

TABLE 1

|  | TEST 1 | TEST 2 |
|---|---|---|
| Mineral substance to be ground | CaCO3 (urgonite) | CaCO3 (urgonite) |
| Concentration in dry material of the suspension submitted to agitation | 76% | 76% |
| Grinding Agent | Sodium Polyacrylate | Sodium Polyacrylate |
| Polymerization medium | water | water and Isopropanol |
| Specific Viscosity of grinding agent | 0.5 | 0.35 |
| Consumption of grinding agent in % by weight dry/dry | 0.97 | 1.08 |
| pH of grinding medium | 9.7 | 9.6 |
| % of mineral substances at 1 micron after grinding | 75 | 75 |
| Grinding temperature maintained at: | 65° C. | 65° C. |
| Viscosity in Cp at 20° C. |  |  |
| - after grinding | 1650 | 3500 |
| - after 24 h. idle agitation before measuring | 2100 | 12000 |
| - after 8 days idle and agitation before measuring | 7000 | 25000 |

The table shows that the viscosity of the suspension after grinding is high, particularly in test no. 2 and also that this viscosity is unstable in time no matter what its initial value is, because it increases significantly when the suspension is idle. The increase is very significant and high in test no. 2.

EXAMPLE 2

This example, illustrating our invention, concerns the grinding of the same Calcium Carbonate used in example 1, in the presence of a grinding agent which is Sodium Polyacrylate obtained by the polymerization of Acrylic Acid using the same process as those used in example 1, tests 1 and 2.

In test no. 3, Calcium Carbonate was ground in the presence of Sodium Polyacrylate obtained as in example 1, test no. 1, by the radical polymerization of acrylic acid in water; the polymerizate was then neutralized by Sodium Hydroxide and extracted as in the invention by means of a polar solvent of the alkaline acrylic polymer fraction with a 0.3–0.8 specific viscosity, the only fraction displaying the fundamental qualities of a very good grinding agent.

In test no. 4, Calcium Carbonate was ground in the presence of Sodium Polyacrylate obtained as in example 1, test no. 2, by the radical polymerization of acrylic acid in an aqueous medium in the presence of Isopropanol. The polymerizate was then neutralized by Sodium Hydroxide and extracted as in the invention by means of a polar solvent of the alkaline acrylic polymer fraction with a 0.3–0.8 specific viscosity, the only fraction displaying the fundamental qualities of a very good grinding agent.

In test no. 3, after the aqueous solution of polymerizate was neutralized, a sample measuring a volume of 80 g of dry polymer in 500 g of water was taken and then agitated with 400 g of methanol. After separation into two phases by decantation, the least dense phase containing most of the polar solvent and the undesirable fractions of acrylic polymer was eliminated, while the densest phase was collected and constituted the alkaline acrylic polymer fraction with the fundamental qualities of a grinding agent, and its specific viscosity was measured at 0.525.

In test no. 4, the aqueous solution of the polymerizate was also neutralized. Then a sample volume of 80 g of dry polymer in 400 g of water was taken. This volume was agitated with 40 g of Isopropanol. The, after separation into two phases, the least dense phase containing the undesirable acrylic polymer fractions was eliminated. The densest phase was collected and constituted the alkaline acrylic polymer fraction displaying the fundamental qualities of a grinding agent, and its specific viscosity was measured at 0.425.

In tests 3 and 4, an aqueous suspension of Calcium Carbonate from the Orgon lode (French), with a granulometry of less than 43 microns, was then prepared.

The dry material concentration of the aqueous suspension was 76% by weight with respect to the total mass.

The grinding agent was introduced into this suspension in the quantities given in Table 2 below, expressed in percent by weight with respect to the mass of Calcium Carbonate to be ground.

The suspension to be ground was placed in the same grinder as the one in example 1, with the same quantity of grinding body, and was treated using the same experimental criteria, so that the results of example 1 and example 2 could be compared.

The results of the experiments are given in Table 2 below:

TABLE 2

|  | TEST 3 | TEST 4 |
|---|---|---|
| Mineral substance to be ground | CaCO3 (urgonite) | CaCO3 (urgonite) |
| Concentration in dry material of the suspension submitted to agitation | 76% | 76% |
| Grinding agent | Sodium Polyacrylate | Sodium Polyacrylate |
| Specific viscosity of grinding agent after extraction by: | 0.525 Methanol | 0.425 Isopropanol |
| Consumption of grinding agent in % by weight dry/dry | 0.83 | 0.63 |
| % of mineral substances at 1 micron after grinding | 75 | 75 |
| pH of grinding medium | 9.6 | 9.7 |
| Grinding temperature maintained at: | 65° C. | 65° C. |
| Viscosity in CP at 20° C. |  |  |
| after grinding | 450 | 290 |
| after 24 h. idle and agitation before measuring | 600 | 485 |
| after 8 days idle and agitation before measuring | 2500 | 850 |
| Polymerization medium | water | water and |

TABLE 2-continued

| | TEST 3 | TEST 4 |
|---|---|---|
| | | Isopropanol |

When compared to the Table in example 1, Table 2 shows an extraordinary decrease in the viscosity of the Calcium Carbonate suspension resulting from the grinding operation of the invention, i.e., carried out in the presence of a grinding agent composed of the acrylic polymer fraction isolated by means of a polar solvent, with a 0.3–0.8 specific viscosity after extraction.

Table 2 also shows a significant improvement in the viscosity of the Calcium Carbonate suspension when tests 1 and 3 and 2 and 4 are compared immediately after grinding as well as after 24 hours and 8 days of idle time.

With the grinding agent in our invention, the viscosity after the grinding of Calcium Carbonate suspensions with a high concentration in dry material, is very low and remains stable in time.

The term "radical polymerization", as used herein, is commonly referred to as a free radical polymerization.

I claim:

1. A process for grinding mineral materials in an aqueous suspension for use in pigment applications, consisting of preparing an aqueous suspension of the mineral materials, introducing a grinding agent in the form of a neutralized alkaline acrylic acid polymer and/or copolymer, consisting of the fraction having a specific viscosity within the range of 0.3 to 0.8, adding to the suspension a grinding body and submitting this mixture to mechanical stirring, wherein the neutralized alkaline acrylic acid polymer and/or copolymer, being a fraction with an 0.3 to 0.8 specific viscosity, is selected at the end of the polymerization in aqueous medium, after neutralization, by introducing a polar solvent into the polymer and/or copolymer aqueous solution said polar solvent eliminating the undesirable fraction of said neutralized alkaline acrylic acid polymer and/or copolymer.

2. Grinding process as claimed in claim 1 in which the aqueous suspension of mineral materials to be ground is composed of at least 70% by weight of dry materials.

3. Grinding process as claimed in claim 1 in which the grinding agent is introduced into the suspension at a rate of 0.2 to 2% by weight of the dried fraction of said polymer with respect to the mass of mineral substance to be ground.

4. Grinding process as claimed in claim 1 in which the grinding body is in the form of granular particles with granulometry comprised between 0.2 and 4 millimeters.

5. Grinding process as claimed in claim 3 in which the grinding body is selected from the group consisting of silicon oxide, aluminum oxide, zirconium oxide or their mixtures, steels and also synthetic resins displaying a high degree of hardness.

6. Grinding process as claimed in claim 1 in which the grinding body is added to the aqueous suspension in a quantity such that the ratio by weight between the grinding material and the mineral substance to be ground is at least 2:1.

7. Grinding process as claimed in claim 1 in which the grinding body is added to the aqueous suspension in the weight ratio between the grinding material and the mineral substance to be ground of between 3:1 and 5:1.

* * * * *

UNITED STATES PATENT AND TRADEMARK OFFICE
CERTIFICATE OF CORRECTION

PATENT NO. : 4,845,191
DATED : July 4, 1989
INVENTOR(S) : Gabriel Hautier

Page 1 of 2

It is certified that error appears in the above-identified patent and that said Letters Patent is hereby corrected as shown below:

Column 2, line 10, change "find" to --fine--

Column 3, line 16, change "had to --has-- line 21, change "be" to --by-- line 59, change "ogranic" to --organic--

Column 4, line 20, change "arylic" to --acrylic--

Column 5, line 28, change "chosed" to --chosen-- line 34, change "material" to --mineral--

Column 6, line 2, change "nature," to --nature-- line 21, change "material" to --mineral-- line 23, change "example" to --examples--

UNITED STATES PATENT AND TRADEMARK OFFICE
CERTIFICATE OF CORRECTION

PATENT NO. : 4,845,191

DATED : July 4, 1989

INVENTOR(S) : Gabriel Hautier

It is certified that error appears in the above-identified patent and that said Letters Patent is hereby corrected as shown below:

Column 7, line 14, change "no. 3" to --no. 3.--

Column 8, line 23, change "The," to --Then,--

Column 10, line 1, change "an 0.3" to --a 0.3-- line 31, change "in the" to --in a--

Signed and Sealed this

Twenty-eighth Day of August, 1990

Attest:

HARRY F. MANBECK, JR.

Attesting Officer

Commissioner of Patents and Trademarks